United States Patent
Kapoor et al.

(10) Patent No.: US 7,701,981 B2
(45) Date of Patent: Apr. 20, 2010

(54) SYSTEM AND METHOD FOR IMPROVING ROBUST HEADER COMPRESSION (ROHC) EFFICIENCY

(75) Inventors: Rohit Kapoor, San Diego, CA (US); Magnus D. Kretz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 710 days.

(21) Appl. No.: 11/413,334

(22) Filed: Apr. 27, 2006

(65) Prior Publication Data

US 2007/0098016 A1     May 3, 2007

Related U.S. Application Data

(60) Provisional application No. 60/731,024, filed on Oct. 27, 2005.

(51) Int. Cl.
*H04J 3/06*     (2006.01)
(52) U.S. Cl. .................................... 370/516
(58) Field of Classification Search .......... 370/310, 370/394, 476, 474, 516
See application file for complete search history.

(56) References Cited

U.S. PATENT DOCUMENTS

2004/0161086 A1 *    8/2004    Buntin et al. .............. 379/189

OTHER PUBLICATIONS

David E. Taylor, Robust Header Compression in Nextr-Generation Network Processors, WUCSE-2004-70.*
Bormann C Et Al, Robust Header Compression (ROHC), Framework and four profiles: RTP, UDP, ESP, and uncompressed, 2001.*
Bormann, C. et al., "Request for Comments 3095, Robust Header Compression (ROHC), framework and four profiles: RTP, UDP, ESP and uncompressed" 2001.
L-E Jonsson, K. and Sandlund, P., Kremer Ercsson: "The RFC 3095 Implementer's Guide", Aug. 26, 2005.

* cited by examiner

*Primary Examiner*—Derrick W Ferris
*Assistant Examiner*—Mang Yeung
(74) *Attorney, Agent, or Firm*—Qualcomm Incorporated; Kam T. Tam; Ken Vu

(57) ABSTRACT

The invention relates to interpreting the change in the increment of the RTP TS field as occurring either due to silence suppression for a voice flow or a change in sampling/frame rate of a video flow. By interpreting this change correctly, the value of the TS_STRIDE field in robust header compression may be correctly calculated leading to efficient header compression performance. In one aspect, there is disclosed a method of improving ROHC between an Access Network (AN) having a compressor and an Access Terminal (AT) having a decompressor, comprising providing flow information to the compressor relating to a change in the increment of an RTP TS field of a header; determining the change in the increment of an RTP TS field as occurring either due to silence suppression or due to a change in a sampling/frame rate; and taking appropriate action for TS_STRIDE.

24 Claims, 4 Drawing Sheets

SYSTEM AND METHOD FOR IMPROVING ROBUST HEADER COMPRESSION (ROHC) EFFICIENCY

CLAIM OF PRIORITY UNDER 35 U.S.C. §119

The present Application for Patent claims priority to Provisional Application No. 60/731,024, entitled "System And Method For Improving Robust Header Compression (ROHC) Efficiency By Correct Interpretation Of Change In The Increment Of The RTP Timestamp," filed Oct. 27, 2005, and assigned to the assignee hereof and hereby expressly incorporated by reference herein.

BACKGROUND

1. Field

The invention relates to data compression and decompression in a communication system and, in particular, to a system and method for improving Robust Header Compression (ROHC) efficiency.

2. Background

ROHC is an Internet Engineering Task Force (IETF) header compression framework that provides for high efficiency and robustness in wireless communication systems. Among other features, ROHC supports Real-time Transfer Protocol/User Datagram Protocol/Internet Protocol (RTP/UDP/IP) and UDP/IP compression profiles. The ROHC working group is also specifying support for a Transmission Control Protocol/Internet Protocol (TCP/IP) compression profile.

ROHC exhibits robustness, i.e., the ability to tolerate errors on the wireless links. ROHC is useable with multi-media applications and provides for header compression for various applications, protocols, and wireless technologies. Header compression is a technique to reduce the packet size transmitted over a link thereby increasing the link efficiency and throughput. Header compression is particularly useful on slow links or when packet sizes are small where a reduction in the header size results in a significant decrease in the header overhead. Header compression achieves this by leveraging header field redundancies in packets belonging to the same flow. In particular, many packet header fields such as source and destination addresses remain constant throughout the duration of a flow while other fields such as sequence numbers change predictably to allow header compression to transmit only a few bytes of header information per packet. FIG. 1 illustrates a typical ROHC compression/decompression block diagram 100 of IP/UDP/RTP headers over a communication link. Typically, reference copies of the full headers are stored at a ROHC compressor 102 and a ROHC decompressor 104 in order to reliably communicate and reconstruct original packet headers. There is a need in the art, however, for a system and method for improving ROHC efficiency by correctly interpreting change in increment of the RTP Timestamp field either due to silence suppression for a voice flow or due to a change in sampling/frame rate of a video flow.

SUMMARY

The invention relates to the change in the increment of the RTP Timestamp field as occurring either due to silence suppression for a voice flow or due to change in sampling/frame rate of a video flow. By interpreting this change correctly, the value of the TS_STRIDE in ROHC may be correctly calculated leading to efficient header compression performance.

In one aspect, there is disclosed a method of improving ROHC between an Access Network (AN) having a compressor and an Access Terminal (AT) having a decompressor, comprising providing flow information to the compressor relating to a change in the increment of a Real-Time Transfer Protocol Timestamp (RTP TS) field of a header; determining the change in the increment of a RTP TS field as occurring either due to silence suppression or due to a change in sampling/frame rate based on the flow information; and sending an appropriate TS_STRIDE value from the access network to the access terminal to achieve efficient ROHC. If the ROHC compressor determines that the RTP TS field increment is changed due to silence suppression, then there is no change to the TS_STRIDE value; if the ROHC compressor determines that RTP TS field increment is changed due to a change in the sampling/frame rate, then the TS_STRIDE value is changed in accordance with the sampling/frame rate. With this aspect, silence suppression may occur only in voice flow, and the change in sampling/frame rate may occur only in video flow.

In another aspect, there is disclosed a system providing ROHC between an access network having a compressor and an access terminal having a decompressor, comprising means for providing flow information to the compressor relating to a change in the increment of an RTP TS field of a header; means for determining the change in RTP TS field increment as occurring either due to silence suppression or due to a change in sampling/frame rate based on the flow information; and means for sending an appropriate TS_STRIDE value from the access network to the access terminal to achieve efficient ROHC. The means for providing the flow information to the compressor may further comprise means for setting the TS_STRIDE value in response to a change in the increment of the RTP TS field. With this aspect, if the determining means determines that the RTP TS field increment is changed due to silence suppression, then there is no change to the TS_STRIDE value; and if the determining means determines that the RTP TS field increment is changed due to a change in the sampling/frame rate, then the TS_STRIDE value is changed in accordance with the sampling/frame rate.

It is appreciated that in the above aspects, the compressor may be at the access terminal and the decompressor may be at the access network and the system and method for improving ROHC efficiency by correctly interpreting change in the increment of the RTP TS would still work.

DETAILED DESCRIPTION

Figure 1:
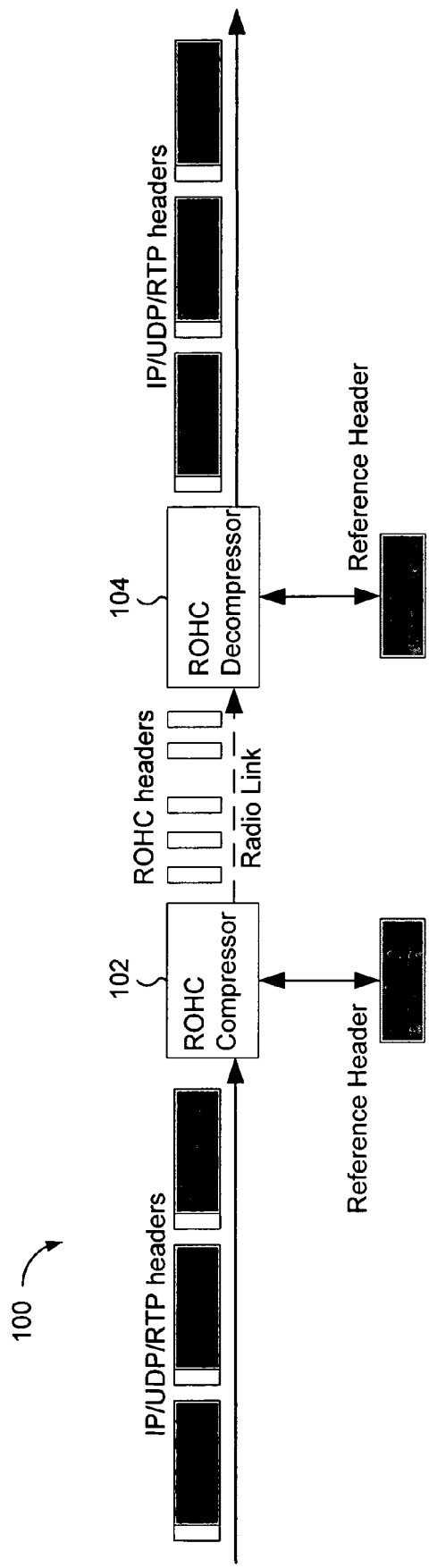
FIG. 1 illustrates a block diagram of a typical ROHC compressor/decompressor in a communication system.
Figure 2:
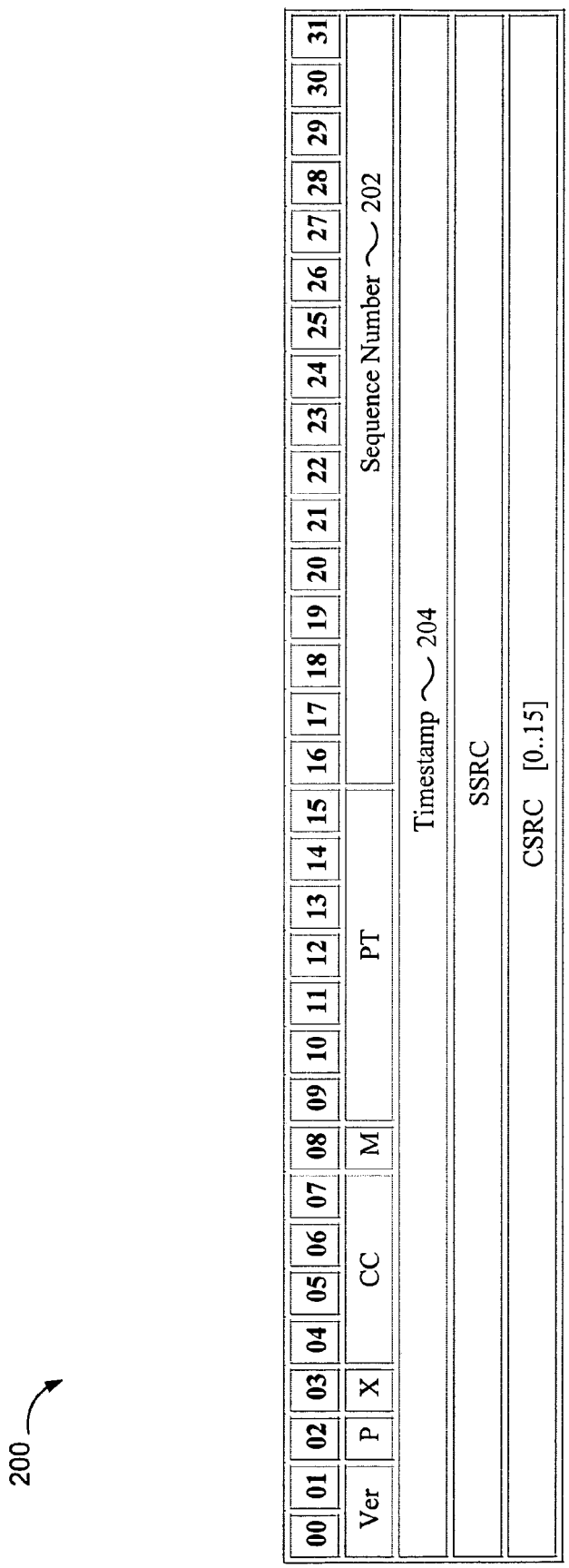
FIG. 2 illustrates an RTP header.

As explained above, ROHC is a header compression scheme that compresses RTP/UDP/IP headers efficiently. Referring to FIG. 2, there is shown an RTP header 200. One of the techniques ROHC uses to compress headers is to compress an RTP Sequence Number (RTP SN) field 202 and then use linear relations from the RTP SN field 202 to other changing fields such as an RTP Timestamp (RTP TS) field 204. The RTP SN field 202 increases by one (1) for every transmitted packet, while the RTP TS field 204 increments according to a sampling rate. According to RFC 3550, available at URL www.faqs.org/rfcs/rfc3550.html, which is fully incorporated herein by reference, "[i]f an audio application reads blocks covering 160 sampling periods from the input device, the timestamp would be increased by 160 for each such block, regardless of whether the block is transmitted in a packet or dropped as silent."

In order to compress headers, the ROHC compressor needs to estimate the increment in the RTP TS field 204 from packet to packet. The value of a parameter called TS_STRIDE is set equal to this increment in the RTP TS field 204. Once this regular change is known, the ROHC compressor can compress a scaled value of the RTP TS field 204, scaled by the regular jump from packet to packet. This allows it to achieve savings in the size of compressed headers. Moreover, in order to compress this scaled of the RTP TS field 204, the ROHC compressor needs to communicate the value of TS_STRIDE to the ROHC decompressor.

Behavior of Voice Source with Silence Suppression

For voice carried over RTP/UDP/IP, the RTP TS field 204 in the RTP header 200 typically increases by a fixed amount from packet to packet. As an example, for a voice codec producing 20 msec packets sampled at 8 kHz, the RTP TS field 204 increases by the number of samples contained in 20 msec, e.g., 8000*0.02=160.

In order to conserve bandwidth when sending Voice over IP (VoIP), the sender can make use of a technique called Silence Suppression. This technique causes the frames generated when the user is silent (or equivalently, when the vocoder is generating $\frac{1}{8}^{th}$ rate frames, as in the case of a vocoder like EVRC) to not be transmitted. This translates into bandwidth savings and increased capacity for communication systems. However, as explained earlier, the RTP TS field 204 increments even during periods of Silence Suppression.

Thus, the first frame generated after the end of the Silence Suppression period will show a jump in the increment of the RTP TS field 204. As an example, for a voice codec producing 20 msec packets sampled at 8 KHz, if say 5 "silent" packets have been suppressed, the RTP TS field 204 will increase by 160*(5+1)=960. In this case, even though there is now a change in the increment of the RTP TS field from 160 to 960, subsequent frames will still have increments of 160 and thus the ROHC compressor should continue using the TS_STRIDE value of 160.

Behavior of Video Source with Adaptive Sampling/Frame Rate

Certain video sources can adapt their sampling/frame rates dynamically during a flow, causing the increment of the RTP TS field 204 to change. As an example, the TS_STRIDE increment may be 50 for the first 10 packets of a video flow, but may change to 100 for the next 10 packets (due to a change in the video's sampling/frame rate). In this case, the ROHC compressor should change its value of the TS_STRIDE when the video's sampling/frame rate changes.

Calculation of the TS_STRIDE

The problem arises due to the requirement that the ROHC compressor needs to interpret the change in the increment of the RTP TS field 204 differently for voice and video flows. In particular, in the case of voice flows, it should not change the value of the TS_STRIDE when there is a change in the increment of the RTP TS field 204 due to silence suppression. For adaptive video flows, on the other hand, the ROHC compressor should change the value of the TS_STRIDE when there is a change in the increment of the RTP TS field 204 due to a change in the video's sampling/frame rate.

The invention identifies that in order to improve the current ROHC, the ROHC compressor should distinguish between the two different causes of change to the increment of the RTP TS field 204. More specifically, the invention recognizes the following:

(1) For voice flows, only silence suppression may take place; typically there is no sampling rate change; and (2) For video flows, change in the increment of the RTP TS field may be caused only by a sampling/frame rate change; silence suppression never takes place (silence suppression is only for voice media).

From the above two observations, silence suppression and sampling or sampling/frame rate change are mutually exclusive; that is, neither silence suppression nor sampling/frame rate change happens in the same flow. Thus, the ROHC compressor can interpret the change in the increment of the RTP TS field 204 correctly if flow information is fed to it.

Such information about the type of flow may be known to the access network. As an example, in 3GPP/3GPP2 systems, the RAN/PDSN typically has access to information about the type of flow and can feed this to the ROHC compressor located in the access network. The AT, on the other hand, may or may not have information about the type of flow. In case the AT does not have such information, one option may be for the AN to pass it such information.

Figure 3:
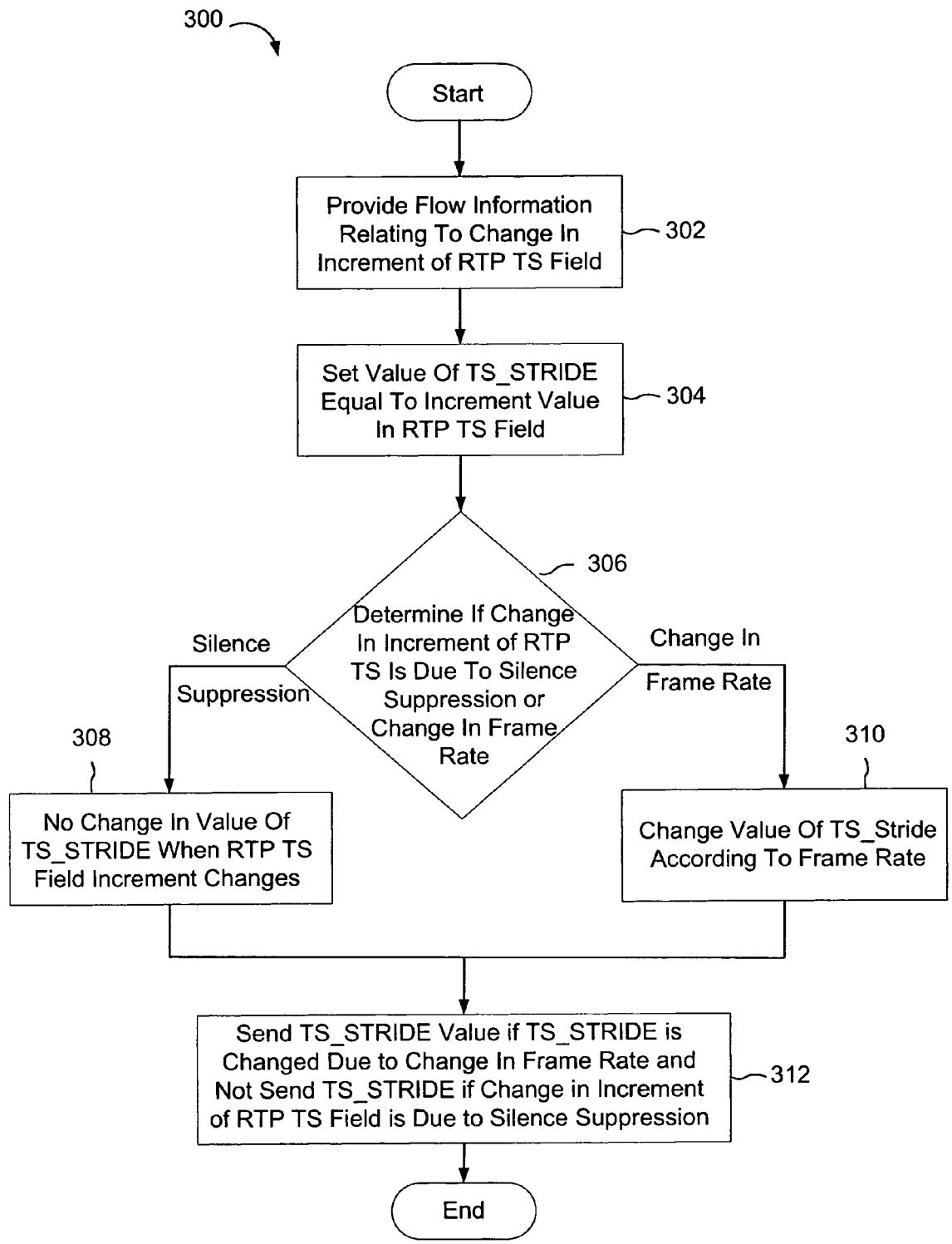
FIG. 3 is a flowchart illustrating the operations of the improved ROHC of the invention.

Referring to FIG. 3, there is shown a flowchart 300 illustrating the operations of the improved ROHC of the invention. In block 302, the AN provides to the AT with flow information relating to a change in the increment of the RTP TS field 204. In block 304, the TS_STRIDE value is set equal to the increment in the RTP TS field 204. In block 306, the ROHC compressor determines the change in RTP TS field increment 204 as occurring either due to silence suppression or due to a change in sampling/frame rate. If the ROHC compressor determines that the RTP TS field increment 204 changes due to silence suppression, then there is no change in the value of TS_STRIDE in block 308. On the other hand, if the ROHC compressor determines that the RTP TS field increment 204 changes due to a sampling or sampling/frame rate change, then there is a change in the value of TS_STRIDE in block 310. In block 312, the AN performs the appropriate behavior for TS_STRIDE, i.e., it sends the TS_STRIDE value to the AT if TS_STRIDE is changed due to a sampling or frame rate change and does not send TS_STRIDE if the change in increment of the RTP TS field is due to silence suppression. As stated above, silence suppression occurs only in voice flow, and the change in the sampling/frame rate occurs only in video flow. The invention also contemplates that the compressor may reside at the AT and the decompressor may reside at the AN. In this case, the AN needs to pass flow information to the AT since the compressor is at the AT.

It is appreciated that if the ROHC compressor does not interpret the change in the increment of the RTP TS field 204 differently based on the type of flow, its performance may suffer. For example, (1) If the ROHC compressor always assumes that change in the increment of the RTP TS field 204 is due to sampling or a sampling/frame rate change, this may cause inefficiencies if the flow is voice. This may cause the ROHC compressor to send a new TS_STRIDE in a larger compressed header (typically an IR, IR-DYN or UOR-2 Ext3 packet) to the decompressor, when the first packet after silence suppression is received. Also, when a few packets subsequent to this first packet have been received, the ROHC compressor will need to revert back to the earlier TS_STRIDE and again communicate this change to the decompressor using a larger header. This will lead to inefficiencies in ROHC performance, particularly when talkspurts are small.

(2) If the ROHC performance always assumes that change in the increment of the RTP TS field 204 is due to silence suppression, this may cause inefficiencies for adaptive video flows. For such flows, even when the sampling/frame rate changes, the ROHC compressor will never attempt to change its value of TS_STRIDE. This may again impact the header compression efficiency of ROHC since the correct TS_STRIDE is not being used for compression.

Accordingly, the invention discloses an improved system and method for the ROHC compressor to interpret changes in the increment of the RTP TS field correctly when either silence suppression takes place in voice flows or the sampling/frame rate changes in adaptive video flows. This leads to better compression efficiency for ROHC.

Figure 4:
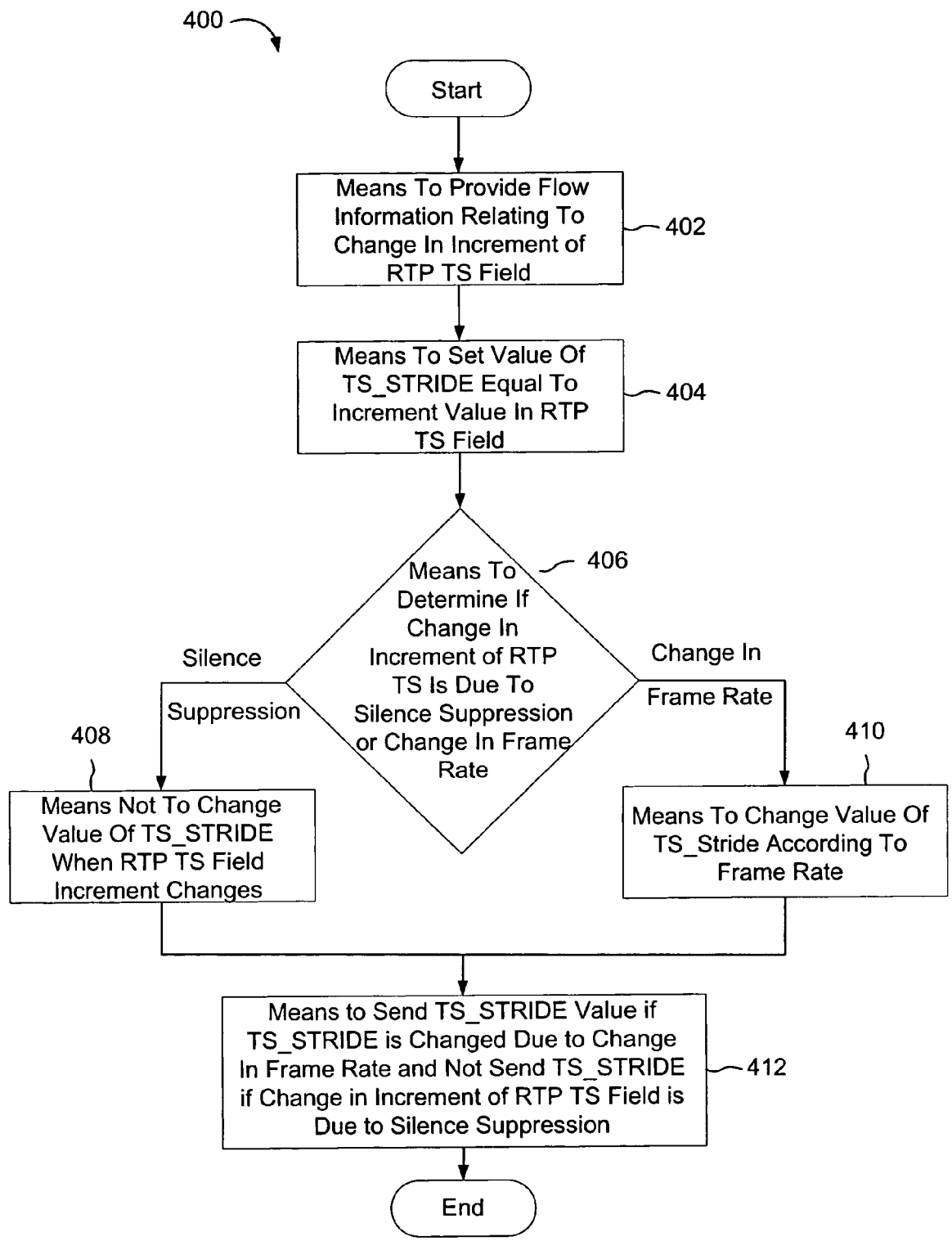
FIG. 4 illustrates an apparatus to perform the method of FIG. 3.

FIG. 4 illustrates an apparatus comprising means 402-412 to perform the method of FIG. 3. The means 402-412 in FIG. 4 may be implemented in hardware, software or a combination of hardware and software.

One of skill would further appreciate that the various illustrative logical blocks, modules, and steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

The invention claimed is:

1. A method operable by an apparatus in a communication network for packet header compression, comprising:
    compressing packets in a call flow in accordance with a first time-stamp stride parameter indicating a first time-stamp increment between packets;
    compressing a packet in the call flow with a second time-stamp increment indicating a change in the time-stamp from a last compressed packet that is different from the first time-stamp increment;
    determining whether the call flow corresponds to voice data;
    if the call flow corresponds to voice data, continuing to compress subsequent packets in the call flow in accordance with the first time-stamp stride parameter; and
    otherwise, compressing subsequent packets in the call flow in accordance with a second time-stamp stride parameter based on the second time-stamp increment.

2. The method of claim 1, wherein compressing sequential packets in the call flow in accordance with the first or second time-stamp stride parameter includes deconstructing a time-stamp corresponding to each packet into the time-stamp stride parameter and a sequence number of the packet.

3. The method of claim 1, wherein determining whether the call flow corresponds to voice data includes discriminating between voice data and video data.

4. The method of claim 3, wherein discriminating between voice data and video data includes determining whether the change in the time-stamp from the last compressed packet being different from the first time-stamp increment arises from silence suppression of voice data or from a changing frame or sampling rate of video data.

5. The method of claim 1, wherein determining whether the call flow corresponds to voice data includes receiving call flow type information from an access network.

6. The method of claim 1, further comprising sending the second time-stamp stride parameter to a decompressor.

7. An apparatus in a communication network for compressing packet header information, comprising:
    means for compressing packets in a call flow in accordance with a first time-stamp stride parameter indicating a first time-stamp increment between packets;
    means for compressing a packet in the call flow with a second time-stamp increment indicating a change in the time-stamp from a last compressed packet that is different from the first time-stamp increment; and
    means for determining whether the call flow corresponds to voice data, wherein the means for compressing packets in the call flow continues to compress subsequent packets in the call flow in accordance with the first time-stamp stride parameter if the call flow corresponds to voice data, and otherwise compresses subsequent packets in the call flow in accordance with a second time-stamp stride parameter based on the second time-stamp increment.

8. The apparatus of claim 7, wherein the means for compressing sequential packets in the call flow in accordance with the first or second time-stamp stride parameter includes means for deconstructing a time-stamp corresponding to each packet into the time-stamp stride parameter and a sequence number of the packet.

9. The apparatus of claim 7, wherein the means for determining whether the call flow corresponds to voice data includes means for discriminating between voice data and video data.

10. The apparatus of claim 9, wherein the means for discriminating between voice data and video data includes means for determining whether the change in the time-stamp from the last compressed packet being different from the first time-stamp increment arises from silence suppression of voice data or from a changing frame or sampling rate of video data.

11. The apparatus of claim 7, wherein the means for determining whether the call flow corresponds to voice data includes means for receiving call flow type information from an access network.

12. The apparatus of claim 7, further comprising means for sending the second time-stamp stride parameter to a decompressor.

13. A computer-readable medium comprising code, which, when executed by a processor, causes the processor to compress packet header information, the code comprising:
instructions for compressing packets in a call flow in accordance with a first time-stamp stride parameter indicating a first time-stamp increment between packets;
instructions for compressing a packet in the call flow with a second time-stamp increment indicating a change in the time-stamp from a last compressed packet that is different from the first time-stamp increment;
instructions for determining whether the call flow corresponds to voice data; and
instructions for continuing to compress subsequent packets in the call flow in accordance with the first time-stamp stride parameter if the call flow corresponds to voice data, and otherwise for compressing subsequent packets in the call flow in accordance with a second time-stamp stride parameter based on the second time-stamp increment.

14. The computer-readable medium of claim 13, wherein the instructions for compressing sequential packets in the call flow in accordance with the first or second time-stamp stride parameter includes instructions for deconstructing a time-stamp corresponding to each packet into the time-stamp stride parameter and a sequence number of the packet.

15. The computer-readable medium of claim 13, wherein the instructions for determining whether the call flow corresponds to voice data includes instructions for discriminating between voice data and video data.

16. The computer-readable medium of claim 15, wherein the instructions for discriminating between voice data and video data includes instructions for determining whether the change in the time-stamp from the last compressed packet being different from the first time-stamp increment arises from silence suppression of voice data or from a changing frame or sampling rate of video data.

17. The computer-readable medium of claim 13, wherein the instructions for determining whether the call flow corresponds to voice data includes instructions for receiving call flow type information from an access network.

18. The computer-readable medium of claim 13, the code further comprising instructions for sending the second time-stamp stride parameter to a decompressor.

19. An apparatus in a communication network for compressing packet header information, comprising:
a processor configured to:
compress packets in a call flow in accordance with a first time-stamp stride parameter indicating a first time-stamp increment between packets,
compress a packet in the call flow with a second time-stamp increment indicating a change in the time-stamp from a last compressed packet that is different from the first time-stamp increment,
determine whether the call flow corresponds to voice data, and
continue to compress subsequent packets in the call flow in accordance with the first time-stamp stride parameter if the call flow corresponds to voice data, and otherwise, compress subsequent packets in the call flow in accordance with a second time-stamp stride parameter based on the second time-stamp increment; and
a memory coupled to the processor and configured to store data used in compressing the packet header information.

20. The apparatus of claim 19, wherein compressing sequential packets in the call flow in accordance with the first or second time-stamp stride parameter includes deconstructing a time-stamp corresponding to each packet into the time-stamp stride parameter and a sequence number of the packet.

21. The apparatus of claim 19, wherein determining whether the call flow corresponds to voice data includes discriminating between voice data and video data.

22. The apparatus of claim 21, wherein discriminating between voice data and video data includes determining whether the change in the time-stamp from the last compressed packet being different from the first time-stamp increment arises from silence suppression of voice data or from a changing frame or sampling rate of video data.

23. The apparatus of claim 19, wherein determining whether the call flow corresponds to voice data includes receiving call flow type information from an access network.

24. The apparatus of claim 19, further comprising transmitter circuitry for sending the second time-stamp stride parameter to a decompressor.

* * * * *